United States Patent [19]
Reinke

[11] Patent Number: 5,536,398
[45] Date of Patent: Jul. 16, 1996

[54] ALGAL FILTER FOR WATER TREATMENT

[76] Inventor: Mark A. Reinke, 7331 S. Sheridan Ct., Littleton, Colo. 80123

[21] Appl. No.: 245,017

[22] Filed: May 18, 1994

[51] Int. Cl.$^6$ .................................... B01D 35/01
[52] U.S. Cl. .................. 210/169; 47/104; 119/260; 210/416.2; 210/456
[58] Field of Search .................. 210/151, 169, 210/416.2, 602, 615, 456; 119/260; 47/1.41

[56] References Cited

U.S. PATENT DOCUMENTS

| | | | |
|---|---|---|---|
| 2,491,853 | 12/1949 | Feldman | 210/169 |
| 3,119,774 | 1/1964 | Arak | 210/169 |
| 3,557,753 | 1/1971 | Dantoni | 119/260 |
| 3,929,101 | 12/1975 | Katz | 119/260 |
| 4,333,263 | 6/1982 | Adey | 47/1.4 |
| 4,851,112 | 7/1989 | Schlensker | 119/260 |
| 4,966,096 | 10/1990 | Adey | 210/615 |
| 5,054,424 | 10/1991 | Sy | 119/260 |
| 5,097,795 | 3/1992 | Adey | 210/169 |

Primary Examiner—Joseph W. Drodge
Attorney, Agent, or Firm—Dorr, Carson, Sloan & Birney

[57] ABSTRACT

An algal filter that purifies and oxygenates aquarium water comprises an elongated box with an inlet and an outlet at opposing ends with supports along the interior of the bottom wall. Trays having a lattice construction rest on the supports. Algae grow on the trays when the trays are contacted by water. A flow of water along the box is induced by a pump. Baffles are situated above the trays in alternation with the supports to alternately direct the water upward and downward through the trays along the length of the filter to produce a turbulent flow of water that potentiates the growth and metabolic exchange capabilities of the algae. Slots in the baffles induce a side to side flow that further enhances turbulence. In addition, the lattice construction of the trays results in quiet areas among the turbulence which may be used as refugiums by plankton and other small organisms. Small organisms are further protected when exiting the filter by a ramp leading to the outlet that effectively smooth the previously turbulent water as it leaves the filter. A lid is placed atop the box and holds artificial lights that illuminate the algae growing on the trays.

22 Claims, 5 Drawing Sheets

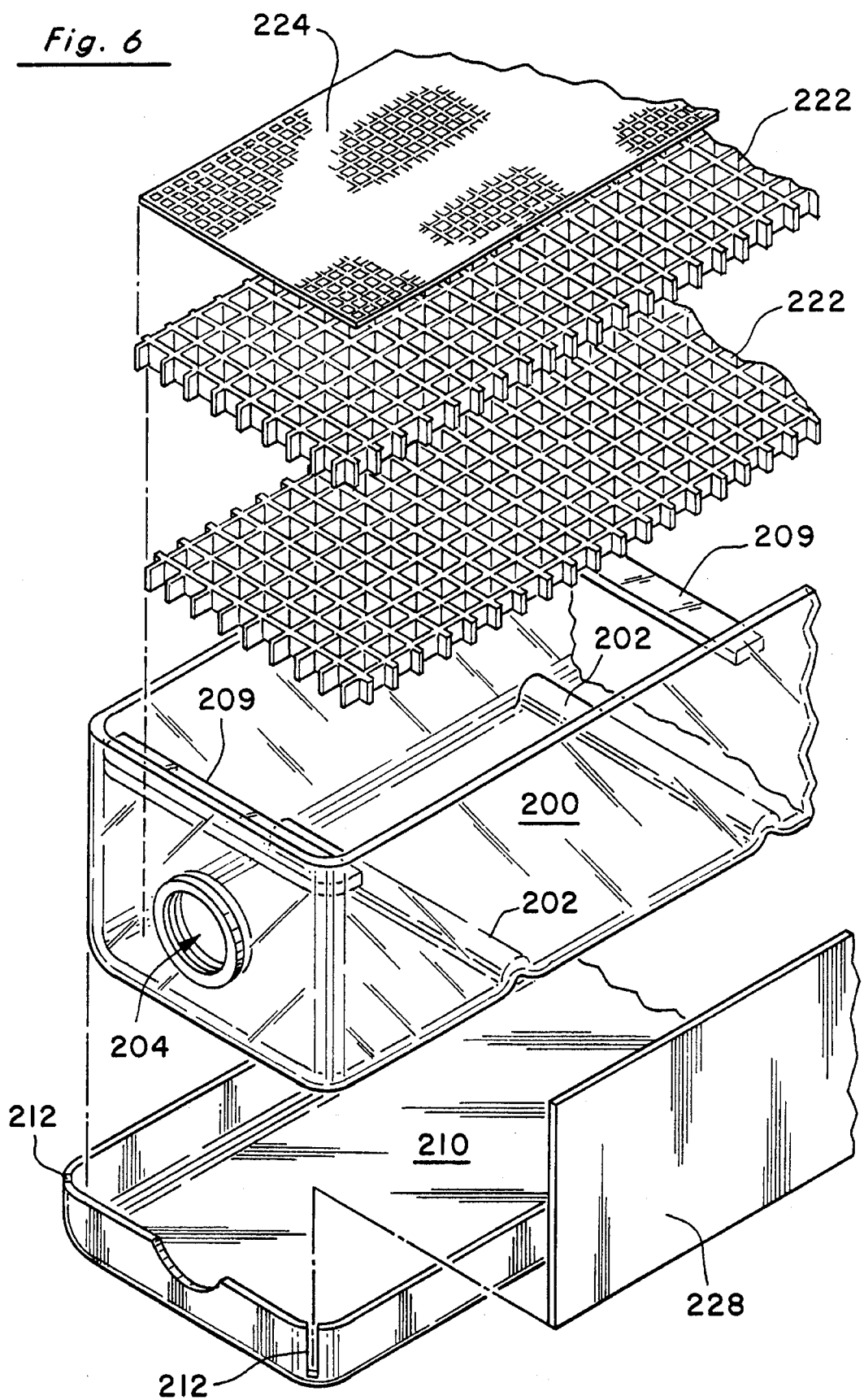

ALGAL FILTER FOR WATER TREATMENT

BACKGROUND OF THE INVENTION

1. Field of the Invention

This invention relates generally to the field of algal filters used for water treatment. More specifically, the present invention provides an algal filter for use primarily in the field of aquarium filtration.

2. Statement of the Problem

Aquariums have long been popular for keeping and displaying fish. However, the recreation of freshwater and saltwater environments in the self-contained systems of home aquariums has presented considerable difficulties. Obtaining a good source water to use in an aquarium, and then maintaining water quality and dealing with waste materials excreted by the aquatic specimens or formed by the natural decomposition by bacteria of plant and animal tissues are difficult tasks, especially in saltwater environments. It is also difficult to maintain species diversity and to duplicate the natural food chain for the captive organisms.

Many types of oxygenation and filtration systems have been used in home aquariums to provide a natural environment for aquatic organisms. Air is bubbled through the water in order to add oxygen. Mechanical filters remove particulates, but also filter out plankton, whose presence in aquatic ecosystems is desirable. Bacteriological filters break down ammonia and convert it into nitrites and then into nitrates which typically accumulate in the aquarium. Also, the bacteria consume oxygen and produce carbon dioxide and reactive nutrients. Chemical filtration has been added to bacteriological filters to control pH. Lighting is often kept low to discourage the growth of algal blooms in response to inherently high nutrient levels. Maintaining aquariums, especially marine aquariums, with these systems does not give satisfactory results.

Algal filters, such as those described by Adey in U.S. Pat. Nos. 4,333,263 (Jun. 8, 1982), 4,966,096 (Oct. 30, 1990), and 5,097,795 (Mar. 24, 1992), are an elegant method for providing biological control of the water quality of small aquatic ecosystems such as those found in home aquariums. In these filtration systems, a dense mat of benthic algae is subjected to bright light and water surge motion created by a surge generator to promote metabolic cellular-ambient water exchange, which removes carbon dioxide and dissolved nutrients and organic compounds and injects oxygen. The surge motion enhances the exchange of metabolites between the algal cells and the water. The mat of algae is periodically harvested to promote growth and prevent overgrowth of macroalgae and thus promote metabolite-exchanging capacity and photosynthesis.

Algal filters work best when the water they purify is moved over the algae in a turbulent fashion, rather than a smooth, continuous flow. The algal filters described by Adey provide this turbulence by using surges in various ways: by moving the tray on which the algae grow through the water in a vibratory or oscillatory fashion using a motor or similar moving means; by using a motor to tilt the tray at intervals, thus releasing the water; or by filling the tray with water, the weight of which then causes the tray to pivot about its axis, releasing the water. In every case, the desired surge is obtained by moving the tray, and in most cases this movement is produced by a motor. In all cases, considerable space must be provided for the movement of the tray. Also, using moving parts to create surges results in significant maintenance requirements, and creates a biological risk to the system inhabitants should the filter fail and remain out of service for an extended period of time.

U.S. Pat. No. 4,966,096 provides a refugium for plankton and small organisms so that they may escape predation. The refugium is separated from the algal filter and may be removed without affecting the filter. Those planktonic organisms that move from the refugium to the filter tray are exposed to the full force of the moving parts and surging water as it enters and exits the tray or as the tray moves through the water and can be injured or killed.

Adey in U.S. Pat. No. 5,097,795 also describes a lighting system that uses very high output fluorescent lights to provide light to the algae to encourage photosynthetic activity and growth.

Previous algal filters sold by the present applicant under the names "Mark's Marine Fish, Inc." or "MMFI, Aquaricare Division," of Denver, Colo., comprise perforated stacked trays placed in a box through which water is pumped. However, these filters did not include baffles, as in the present invention, for directing water alternately upward and downward and from side to side through the trays.

To conserve space, to reduce maintenance costs, and to reduce the risk of failure of moving parts, it is desirable to provide turbulent water flow across an algal filter without using moving parts. It is also desirable to provide a filter system that uses standard lighting to drive photosynthesis and that contains a built-in refugium. A system that contains more than one tray of algae is more efficient in maintaining water quality, and allows rotational harvesting of the algal growth to foster regrowth after harvesting. An integral refugium for plankton is needed to save space and to reduce the rate of death and injury to these plankton as they move through the filter. These and other desirable qualities are provided by the present invention.

3. Solution of the Problem

The present invention provides an algal filter in which turbulent water flow through the filter is produced by a system of baffles and supports that respectively direct water flowing along the filter downward and upward and from side to side along the filter. Because the algal trays themselves do not move, multiple layers or stacks of trays may be employed to support an increased amount of algae to clean the aquarium water. Multiple trays also enable different types of tray surfaces to be used, allowing different varieties of algae to be grown, thus providing a more biologically diverse system for maintaining water quality. The baffles may be moved to different locations in the filter, providing flexibility in producing turbulence patterns.

The present invention also contemplates the use of a transparent or translucent material to construct certain parts of the filter, such as the exterior housing, baffles and trays, and the use of reflective walls, so that light reaches virtually every surface on which algae might grow, encouraging yet more algae to grow. The reflective surfaces are located out of contact with the water and thus do not become obscured since algae does not grow on them. The reflective surfaces can be readily removed to monitor operation of the filter. Standard fluorescent lights may be used, presenting substantial cost savings.

A refugium for plankton and other small organisms is an integral part of the filter. The lattice of the trays provides areas in which plankton may find refuge, grow, and remove waste materials and nutrients from the water. This encourages species diversity in the aquarium ecosystem. A ramp at the outlet end of the filter smooths out the flow of water exiting from the filter so that the plankton are not injured as they move out of the filter. Those plankton that do exit the filter provide a natural food source for larger aquatic organisms, for example, many fish, shellfish and anemones, that are displayed in the aquarium.

SUMMARY OF THE INVENTION

Water is circulated from an aquarium tank and through an algal filter, in which a series of baffles cause the water to pass up and down and back and forth through trays on which algae grow. The turbulent movement of the water in this fashion potentiates the metabolic exchange capacity of the algae, so that the algae are able to efficiently purify and oxygenate the water as it moves through the filter. The patterns of turbulence change over time as a result of algae growth and harvesting.

It is a primary object of the present invention to provide an algal filter that produces turbulent water without the need for moving parts or motors.

Another object of the present invention is to support a greater amount and variety of algae in a compact filter.

A further object of the present invention is to provide an algal filter that enables standard fluorescent lights to be used.

Yet another object of the present invention is to supply a filter that provides an integral refugium for plankton and small organisms.

These and other advantages, features, and objects of the present invention will be more readily understood in view of the following detailed description and the drawings.

BRIEF DESCRIPTION OF THE DRAWING

The present invention can be more readily understood in conjunction with the accompanying drawings, in which:

FIG. 6 illustrates an exploded perspective view of the inlet end of the algal filter and shows multiple layers and multiple stacks of the trays.

DETAILED DESCRIPTION OF THE INVENTION

Figure 1:
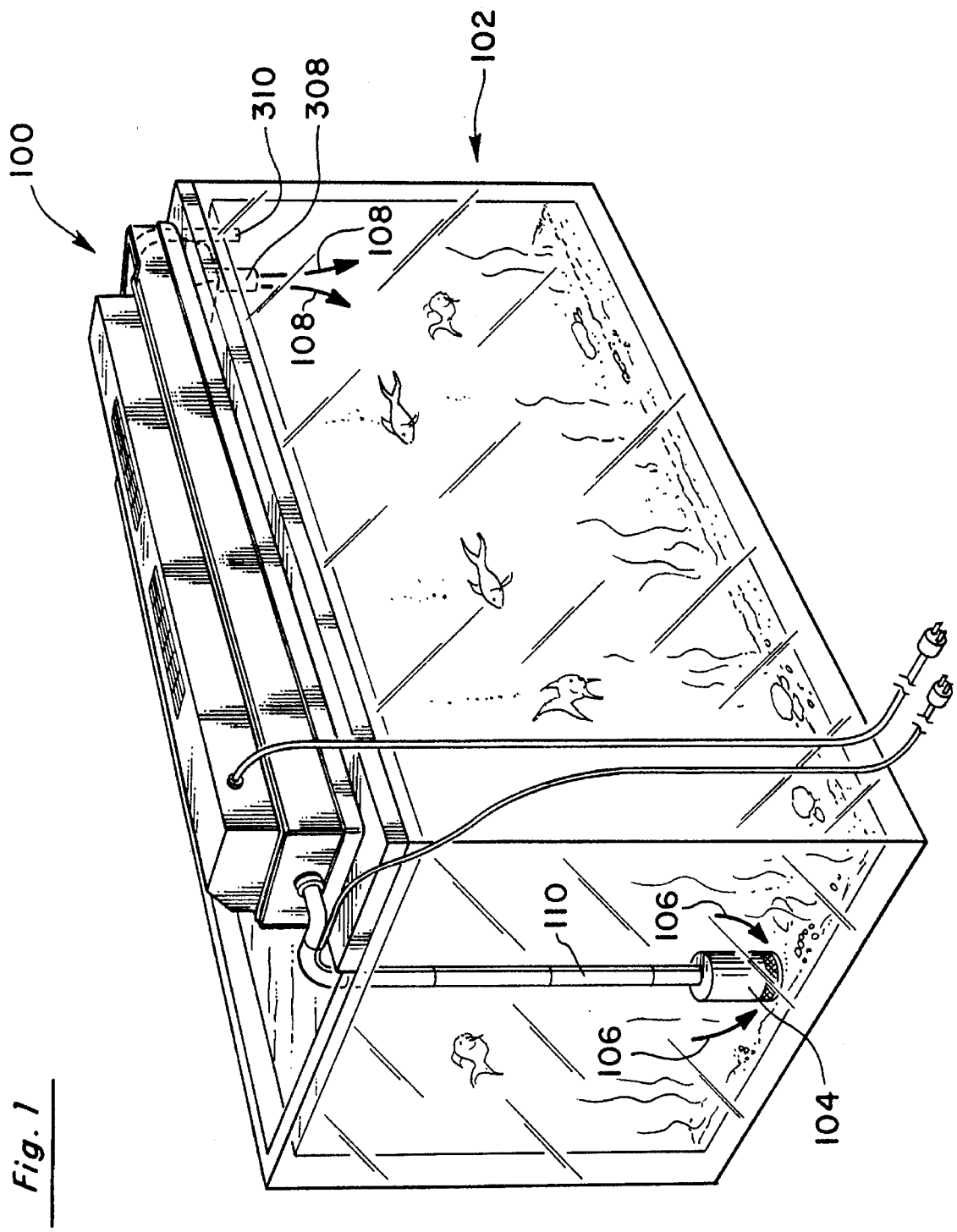
FIG. 1 shows a perspective view of the algal filter of the present invention in place over an aquarium.

Turning to FIG. 1, the algal filter 100 of the present invention is shown placed over an aquarium 102. This figure shows a conventional pump 104 that pumps water 106 from the aquarium through an inlet tube 110 into the filter 100. The water exits the filter 108 via an outlet tube 308. An overflow outlet tube 310 provides an alternative exit for the water in the event that the outlet tube 308 becomes inoperative. It should be expressly understood that alternative means could be employed to pumping or circulate water from the aquarium through the filter. For example, the pump can be mounted within the aquarium or contained in the filter itself. Alternatively, water can be circulated by means of airlift tubes or siphon-overflow devices, commonly called "prefilters."

The algal filter 100 of the present invention is used to maintain both freshwater and saltwater aquariums. However, it is to be expressly understood that the use of the algal filter 100 of the present invention is not limited to aquariums, but that the filter 100 can be used to purify other discrete bodies of water.

Figure 2:
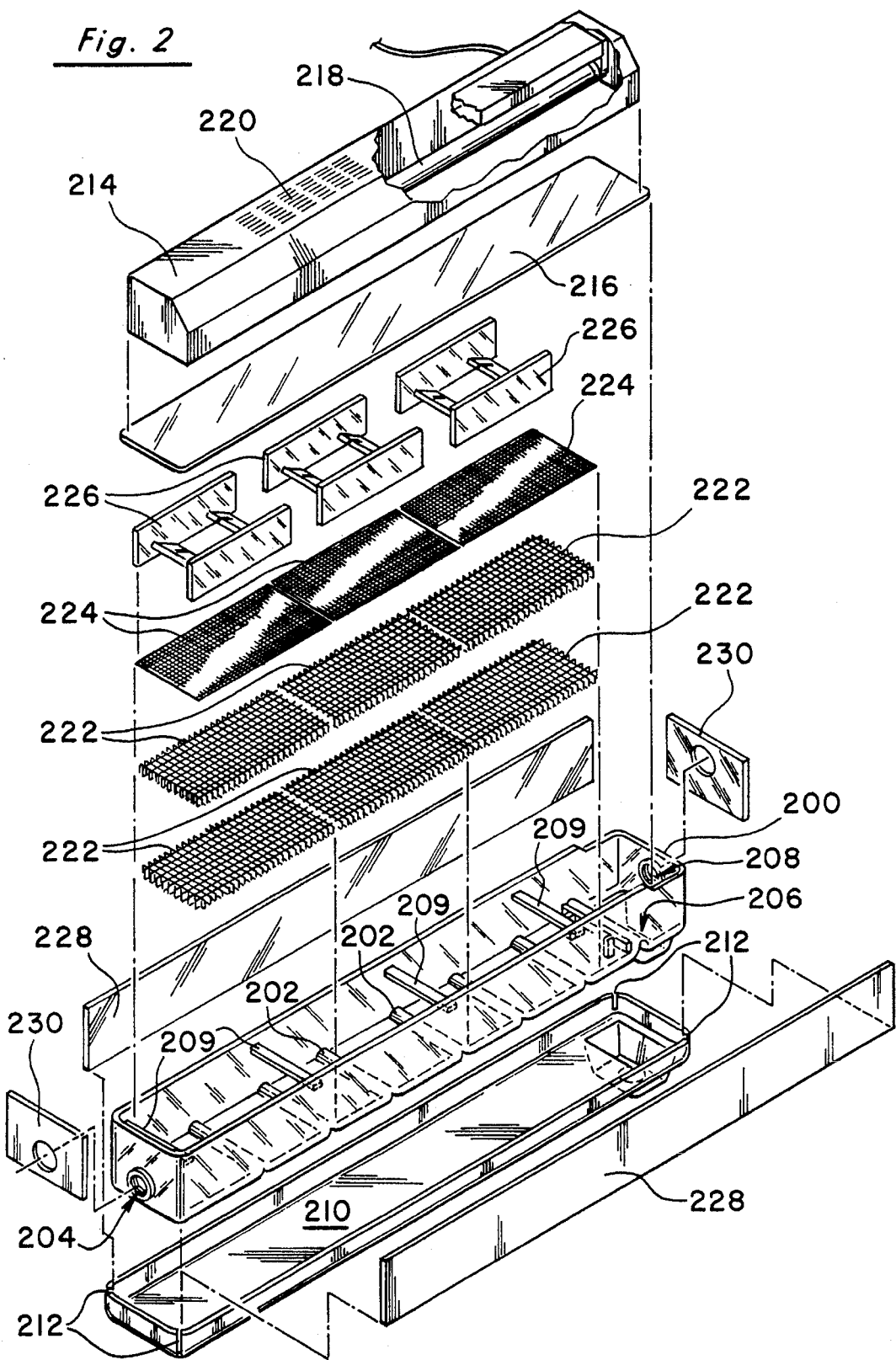
FIG. 2 provides an exploded perspective view of the algal filter of the present invention.
Figure 3:
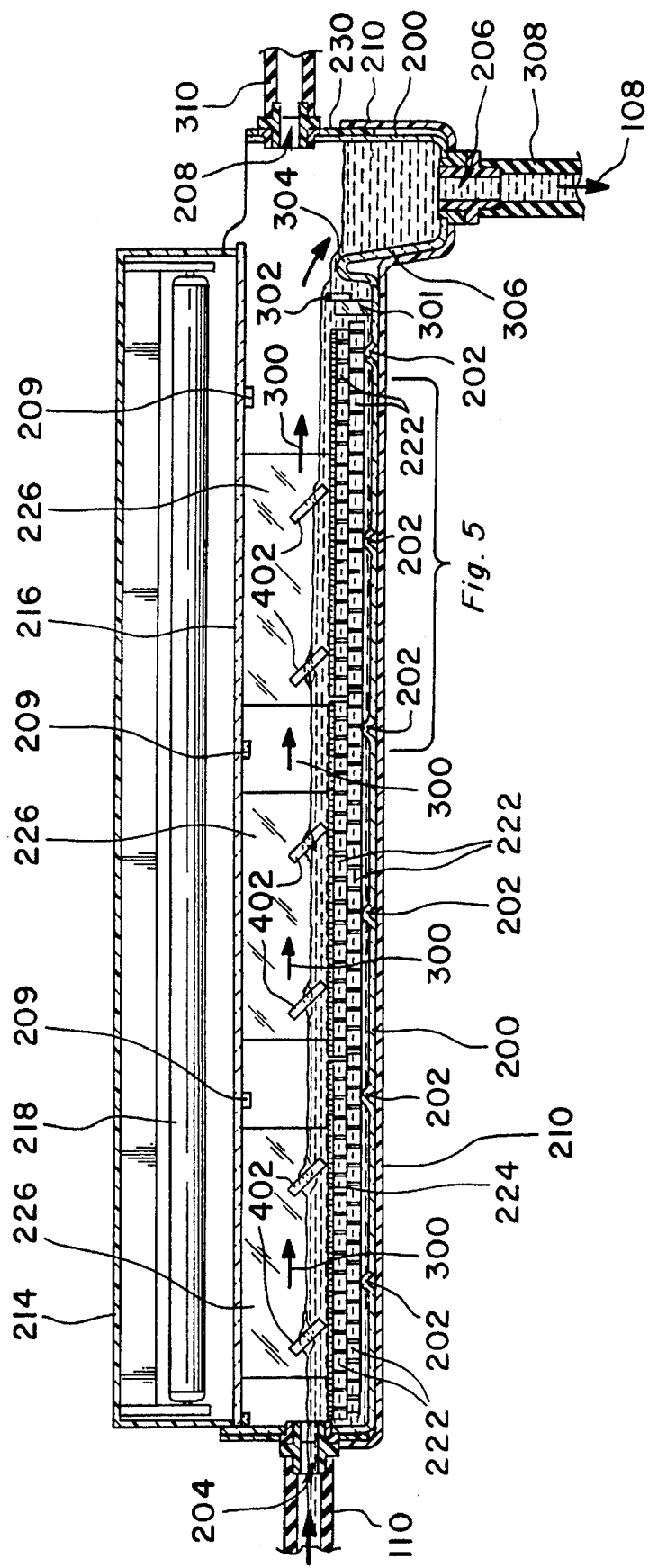
FIG. 3 illustrates a side elevational view of the algal filter of the present invention.

The structure of the algal filter 100 is shown in FIGS. 2 and 3. An elongated box 200 is supported by a platform 210. The box 200 has an inlet 204 in one end and an outlet 206 in the bottom of the box 200 near the other end. An overflow outlet 208 is cut through the wall of the box 200 above the usual outlet 206. Water is delivered to the filter from the aquarium tank 102 by the water pump 104 through the inlet 204 and into the box 200. The force provided by the pump 104 to the water moves the water along the box 200 in the direction of arrows 300 to the outlet 206, where it exits the box 200 and returns to the aquarium tank 102.

Integral supports 202 are placed at intervals along the bottom of the box 200. Atop these supports 202 rest trays 222 and 224 on which the algae grow. As shown in FIG. 6, the trays 222 and 224 have a lattice construction, with one type of tray 222 having a coarser lattice and being thicker than the other type of tray 224. These differing constructions enhance the desired turbulence and enable different varieties of algae to grow in their preferred environments. Although the preferred embodiment described here shows lattices that form squares, it should be understood that any construction of tray can be used that provides a surface on which algae can grow, disperses the flow of water, and enables water to flow through the tray. For example, flat trays having numerous perforations of a size sufficient to permit water to flow freely through them would provide these requirements. The lattice construction shown in FIGS. 2 and 6 is advantageous in that it provides a maximum amount of surface on which algae may grow. It is also advantageous in that it enables a maximum amount of water to turbulently flow through the trays 222, 224. Although three trays 222, 224 of two types are shown in the preferred embodiment, it is to be expressly understood that the teachings of the present invention encompass the use of other numbers and types of trays as will be evident to those skilled in the art.

The trays 222, 224 are easily removable, allowing algae to be scraped off the trays from time to time to export or recycle nutrients embodied in the algae, and to promote new growth and enhanced metabolite exchange. The easy insertion of the trays 222, 224 and their portability also allows the user to transfer trays 222, 224 between aquariums to seed a new system.

A lid 214 containing a light source is placed on a transparent platform 216 over the box 200. The transparent platform 216 is supported by crossbars 209. The light source can be a conventional fluorescent bulb 218. The fluorescent bulb 218 provides sufficient light to promote photosynthesis in the algae, and very high intensity bulbs are not necessary. Vents 220 in the lid 214 allow heat produced by the bulb 218 and water vapor to escape from the lid 214. It also provides a surface for condensation to minimize the amount of water lost through evaporation. The transparent platform 216 prevents the water flowing through the box 200 from splashing on the bulb 218 or corroding the bulb mount.

Figure 4:
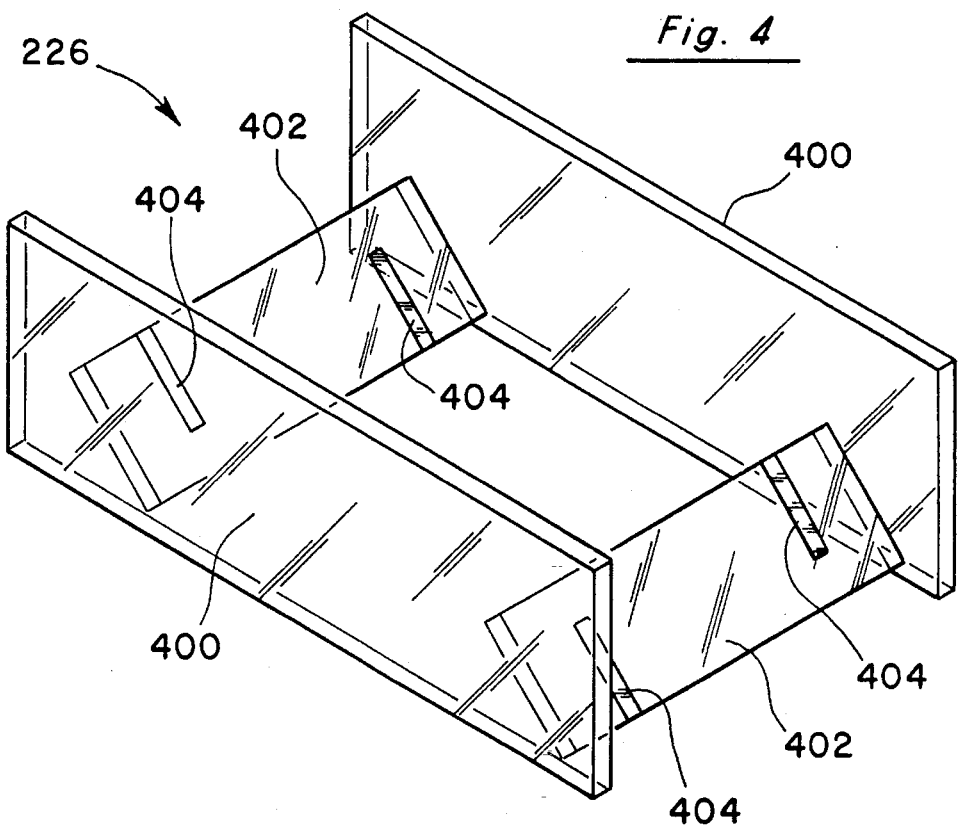
FIG. 4 shows a perspective view of the baffle of the present invention.

The algal filter 100 performs best if the flow of water across the algal mat surges or is turbulent. To provide turbulence, partially submerged baffles 226 are placed in the box 200 above the trays 222, 224. As shown in FIG. 4, each baffle 226 is formed of two side walls 400 that are joined together by angled baffle plates 402. The baffle plates 402 are placed so that their bottom edges are adjacent to the bottom edges of the side walls 400, while their top edges extend approximately halfway between the top and bottom edges of the side walls 400. The baffle 226 is placed in the box 200 so that the water 300 flowing through the box 200 first contacts the baffle plate 402 and is thus directed downward through the lattice of the trays 222, 224 by the angle of the baffle plate 402.

Figure 5:
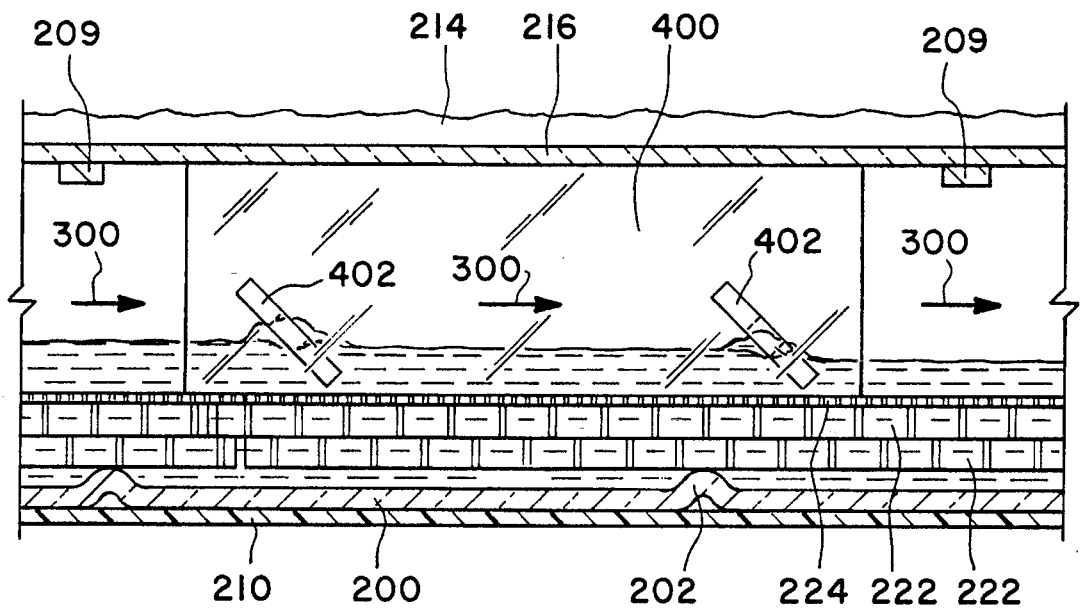
FIG. 5 is an enlarged side elevational view of a portion of the algal filter of FIG. 3.

Each angled baffle 226 is placed in the box 200 so that the baffle plates 402 and the supports 202 on which the trays 222, 224 rest alternate; that is, water flowing 300 through the box 200 is first directed downward through the trays 222, 224 by a baffle plate 402 and then contacts a support 202 that directs the water upward through the trays 222, 224. The water will then be forced downward by the next baffle plate 402 and upward by the following support 202. This alternation of baffle plates 402 and supports 202 is most clearly shown in FIG. 5. By directing the water up and down through the lattice of the trays 222, 224, the system produces the desired turbulence, enabling the most productive growth and metabolic activity of the algae growing on the trays 222, 224. It will be clear to those skilled in the art that other combinations of baffles and supports or barriers that produce water flows through the algal trays may be used and that such other combinations are within the scope and spirit of the present invention.

Each baffle plate contains several slots through which a portion of the flowing water 300 directly passes. This performs several functions, including preventing a stagnant surface layer from forming. The slots also create a horizontal, side-to-side current that interacts with the downward current created by the angled baffle plate. The competing currents enhance the turbulence by encouraging more randomized water flow. The baffles are partially submerged. Over time, the slots become clogged to varying degrees as the algae grows. This creates ever changing flow patterns that further enhance turbulence and its resulting benefits. Also, when the algae is harvested, the flow patterns change again. It should also be noted that the baffle structure can be made substantially narrower than the width of the filter housing. This allows the baffle to be rotated to a degree about a vertical axis or offset laterally to further create new flow patterns.

The efficiency of the algal filter 100 is increased when the algae are the most photosynthetically, and therefore metabolically, active. The present invention achieves this activity in several ways. First, because the trays 222, 224 on which the algae grow are stationary, the fluorescent bulb 218 that provides light can be placed very close to the algae. Second, the elongated box 200, crossbars 209, and baffles 226 are made from a transparent material such as plastic or glass, and the trays 222, 224 on which the algae grow are formed from a transparent or translucent material. Light from the fluorescent bulb 218 thus reaches a very large portion of the lattice trays 222, 224, greatly increasing the accessible surface on which the algae can grow. This effect is enhanced by the use of reflective side walls 228 and reflective end walls 230 that are removably placed adjacent to the walls of the transparent box 200. The reflective side walls 228 are held in place by slots 212 at the corners of the platform 210 that supports the box 200. The stationary trays 222, 224, light-transmitting materials, and reflective walls 228, 230 permit a conventional fluorescent bulb 218 to be used rather than the very high intensity bulb used in the prior art filters.

The combination of trays 222, 224, baffles 226, and supports 202 also has the effect of providing an integral refugium for plankton and other small organisms when water flows through the filter 100. The presence of plankton is advantageous to the health of aquariums, especially salt water aquariums. Plankton metabolize certain nutrients and are a food source for fish and other aquatic organisms. However, plankton can be injured or killed when subjected to contact with moving parts and redaire quiet areas in which to escape predation and reproduce. The algal filter 100 provides these quiet areas in two ways.

First, when the baffles 226 and supports 202 direct the flowing water through the trays 222, 224, certain areas among the lattices of the trays 222, 224 will remain relatively quiet, acting as refugiums for the plankton. Second, many plankton do not survive the trip through the outlet returning the filtered water to the aquarium tank. The algal filter 100 alleviates this problem by sending the flowing water 300 down a ramp 306 to the outlet 206.

Between the ends of the trays 222, 224 and the outlet 206, a first barrier 302 is placed on supports 301 such that the barrier 302 forces some of the water to pass over it and forces some of the water exiting the filter to be drawn from lower water levels in the filter to increase turbulence. Immediately thereafter, the water passes over the smooth ridge formed by barrier 304 and moves down ramp 306 to the outlet 206. The barriers 302, 304 and ramp 306 create desired turbulence followed by an immediate smoothing effect on the flow of water exiting the filter 100 so that those plankton and other small organisms passing through the outlet 206 are less likely to be killed or damaged. The barrier 304 also creates a reservoir in the filter to protect the algae and other small organisms should the water flow stop for some reason, such as a power failure.

Although FIG. 3 shows a certain combination of barriers 302, 304 and ramp 306, it is to be expressly understood that the present invention encompasses other combinations and types of barriers and ramps that will be evident to those skilled in the art.

The above disclosure sets forth a number of embodiments of the present invention. Other arrangements or embodiments, not precisely set forth, could be practiced under the teachings of the present invention and as set forth in the following claims.

I claim:

1. An algal filter for use with an aquarium, comprising:
    an elongated box having an inlet, an outlet, side walls, and a bottom wall;
    a plurality of supports spaced along said bottom wall of said box;
    a tray having perforations resting on said supports for growing algae on said tray when said tray is contacted by water;
    pump means for inducing a flow of water along said box;
    a plurality of baffles situated above said tray at intervals so as direct said water downward through said tray and thereby create regions of turbulence in said water; and
    artificial light means attached to said box to illuminate algae growing on said tray.

2. The algal filter of claim 1, wherein said side walls are reflective.

3. The algal filter of claim 1, wherein said tray has a lattice structure.

4. The algal filter of claim 1, wherein said baffles and said supports are interspaced so that said water is alternately directed down and up along said filter.

5. The algal filter of claim 1, wherein said baffles further comprise slots for inducing a side to side flow of said water.

6. An algal filter, comprising:

a box having an inlet and an outlet at opposing ends;

a plurality of supports along the interior bottom wall of said box;

a tray with perforations resting on said supports for growing algae on said tray when said tray is contacted by water;

pump means for inducing a flow of water along said box;

a plurality of baffles situated above said tray so as to direct said flow of water downward through said perforations in said tray, said supports directing said flow of water upward through said tray, said baffles being interspaced with said supports so that said water is alternately directed down and up to create regions of turbulence in said water; and artificial light means attached to said box to illuminate the algae growing on said tray.

7. The algal filter of claim 6, wherein the bottom of said box forms a ramp downward from the end inlet of said tray to said outlet end.

8. The algal filter of claim 6, wherein said side walls are reflective.

9. The algal filter of claim 6, wherein said tray has a lattice structure.

10. The algal filter of claim 6, wherein said tray is formed from a translucent material.

11. The algal filter of claim 6, wherein said baffles are formed from a transparent material.

12. The algal filter of claim 6 wherein said baffles further comprise slots for inducing a side to side flow of said water.

13. An algal filter for purifying and oxygenating aquarium water, comprising:

an elongated box having an inlet and an outlet at opposing ends and having at least two supports along the interior of the bottom wall;

a tray having a lattice construction resting on said supports, said tray enabling the growth of algae thereupon when said tray is contacted by water;

pump means for inducing a flow of water along said box;

a plurality of baffles situated above said tray so as to direct a flow of water from said inlet downward through the lattice of said tray, said supports directing said flowing water upward through the lattice of said tray to create regions of turbulence in said water; and a lid removably placed atop said box, said lid further comprising artificial light means to illuminate the algae growing on said tray.

14. The algal filter of claim 13, wherein the bottom wall of said box forms a ramp downward from the end inlet of said tray to said outlet end.

15. The algal filter of claim 13, wherein said tray is formed from a translucent material.

16. The algal filter of claim 13, wherein said baffles are formed from a transparent material.

17. The algal filter of claim 13, wherein said side walls are reflective.

18. The algal filter of claim 13, wherein said tray is removable.

19. The algal filter of claim 13, wherein said tray is stacked on another said tray.

20. The algal filter of claim 13, wherein said baffles are removable.

21. The algal filter of claim 13, wherein said baffles further comprise two side walls and an angled baffle plate placed between said two side walls.

22. The algal filter of claim 21, wherein said baffle plate comprises a slot for inducing a side to side flow of said water.

* * * * *